No. 788,517. PATENTED MAY 2, 1905.
W. CLEMENS & A. LE BLANC.
ROTARY ENGINE.
APPLICATION FILED FEB. 27, 1905.
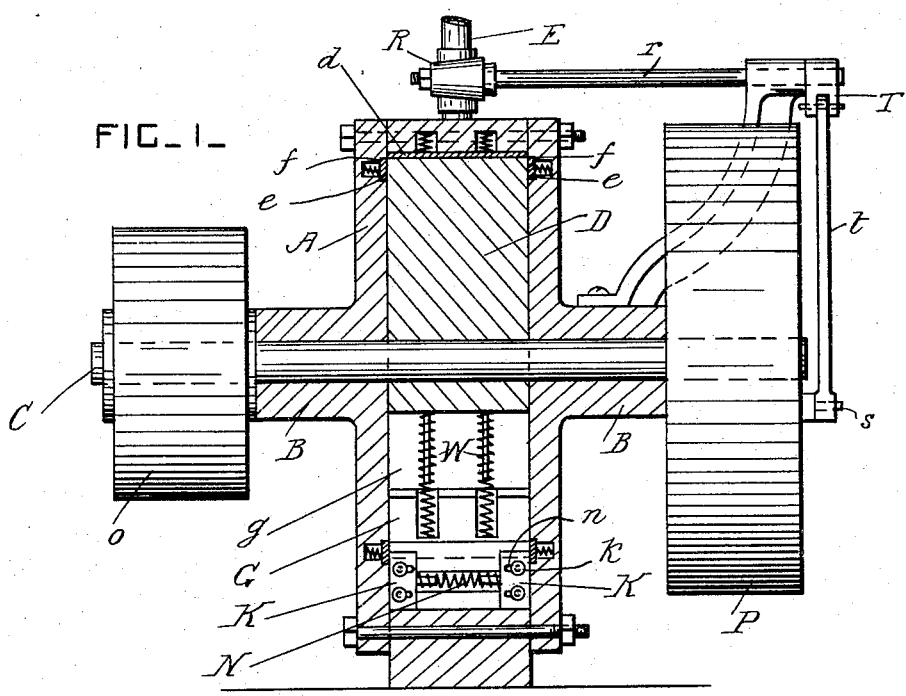
FIG_1_
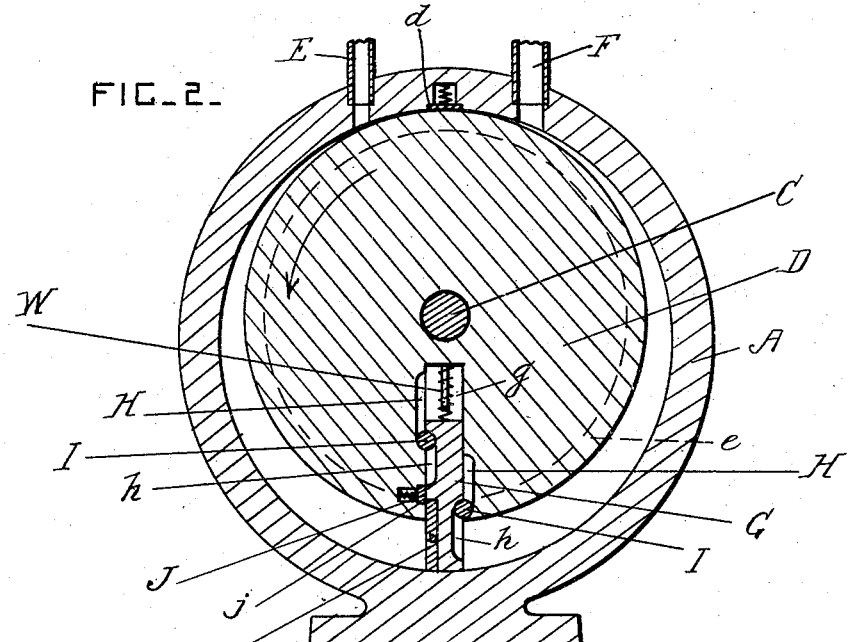
FIG_2_
WITNESSES:
J. Bragg Poole
Robt. A. Cissel.
INVENTORS
William Clemens, &
Alphonse Le Blanc.
BY
Herbert W. Jenner.
Attorney No. 788,517.

Patented May 2, 1905.

UNITED STATES PATENT OFFICE.

WILLIAM CLEMENS AND ALPHONSE LE BLANC, OF HUSON, MONTANA.

ROTARY ENGINE.

SPECIFICATION forming part of Letters Patent No. 788,517, dated May 2, 1905.

Application filed February 27, 1905. Serial No. 247,574.

*To all whom it may concern:*

Be it known that we, WILLIAM CLEMENS and ALPHONSE LE BLANC, residing at Huson, in the county of Missoula and State of Montana, have invented certain new and useful Improvements in Rotary Engines; and we do hereby declare the following to be a full, clear, and exact description of the invention, such as will enable others skilled in the art to which it appertains to make and use the same.

This invention relates to rotary engines; and it consists in the novel construction and combination of the parts hereinafter fully described and claimed.

In the drawings, Figure 1 is a vertical longitudinal section through the engine. Fig. 2 is a cross-section through the engine-cylinder.

A is a cylinder, of any approved construction, provided with bearings B, which are arranged eccentric of the center line of the cylinder and preferably above the said center line.

C is the engine-shaft, which is journaled in the said bearings and which has the piston D secured upon it. The piston D is a disk which is arranged concentric with the shaft C, and $d$ is a spring-pressed packing-strip which works in a slot in the upper side of the cylinder and which bears against the periphery of the said piston constantly.

E is the steam-inlet pipe, and F is the steam outlet or exhaust pipe. These two pipes are arranged at the upper part of the cylinder and upon opposite sides of the said packing-strip. The sides of the piston are kept steam-tight in the cylinder by means of spring-pressed packing-rings $e$, which are arranged in annular grooves $f$ in the sides of the cylinder. The piston is provided with a radial slot $g$, and G is an abutment-plate which is slidable in the said slot. The piston has enlargement-cavities H on each side of the slot, and $h$ are similar cavities in the sides of the abutment-plate.

I represents antifriction-rollers which are arranged in the said cavities between the abutment-plate and the piston.

J is a spring-pressed packing-plate which is let into a groove $j$, formed in the side of the slot near the periphery of the piston. This plate bears against the abutment-plate and keeps it steam-tight.

K represents packing-plates which are slidable upon pins or screws upon one face of the abutment-plate. These plates K are provided with slots $n$ in order that they may slide upon the pins or screws $k$. N is a spring or springs which press the said plates apart laterally into contact with the sides of the cylinder, so that the abutment-plate works steam-tight in the cylinder.

A driving-pulley $o$ is secured upon the engine-shaft, and P is a fly-wheel which is also operatively connected with the said shaft. This fly-wheel is preferably constructed as a speed-governor or is provided with a speed-governor of any approved construction.

R is a steam-admission valve in the steam-pipe, and $r$ is the spindle of the said valve. The governor or fly wheel is provided with a pin $s$, which is arranged eccentric of the engine-shaft, and $t$ is a rod which operatively connects the said pin with an arm T, secured on the said valve-spindle, so that the said admission-valve is operated from the engine-shaft. The piston is revolved by the steam which is admitted through the steam-pipe and which bears against one side of the abutment-plate in the direction of the arrow and which finally passes out of the exhaust-pipe.

W represents springs, which together with centrifugal force press the abutment-plate radially in the slot of the piston.

What we claim is—

1. In a rotary engine, the combination, with a cylinder, of a piston journaled eccentric of the said cylinder and provided with a radial slot having cavities in its opposite sides, an abutment-plate slidable in the said slot and also provided with cavities in its sides, antifriction-rollers arranged in the said cavities, and spring-pressed packing-plates which keep the said abutment-plate steam-tight in the said slot and cylinder.

2. In a rotary engine, the combination, with a cylinder, of a piston journaled eccentric of the said cylinder and provided with a radial slot having cavities in its opposite sides, an abutment-plate slidable in the said slot and also provided with cavities in its sides, antifriction-rollers arranged in the said cavities, two slidable packing-plates carried by the said abutment-plate, means for pressing the said packing-plates in opposite directions against the sides of the said cylinder, and a packing-plate carried by the said piston and bearing against one face of the said abutment-plate.

In testimony whereof we affix our signatures in presence of two witnesses.

WILLIAM CLEMENS.
ALPHONSE LE BLANC.

Witnesses:
  DAVID ROSE,
  CYRILLE BOURGEOIS.